(12) United States Patent
Oitaka et al.

(10) Patent No.: US 6,514,184 B2
(45) Date of Patent: Feb. 4, 2003

(54) ROTATING TOOL POT CHAIN

(75) Inventors: Michio Oitaka, Osaka (JP); Kazuhiko Araki, Osaka (JP); Hiroshi Yokota, Osaka (JP); Kazuo Kouyama, Osaka (JP); Shinichi Ozaki, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 10/099,657

(22) Filed: Mar. 15, 2002

(65) Prior Publication Data

US 2002/0137612 A1 Sep. 26, 2002

(30) Foreign Application Priority Data

Mar. 23, 2001 (JP) ........................................ 2001-085901

(51) Int. Cl.[7] ............................................... B23Q 3/157
(52) U.S. Cl. ............................... 483/60; 483/65; 483/68
(58) Field of Search ............................. 483/60, 65, 68, 483/66, 58; 211/1.55, 70.6; 198/465.1

(56) References Cited

U.S. PATENT DOCUMENTS 4,309,809 A * 1/1982 Yokoe et al. ................. 483/47
4,384,397 A * 5/1983 Nelson .......................... 483/41
5,797,825 A * 8/1998 Murata et al. ................. 483/53
6,042,524 A * 3/2000 Kato ............................ 483/62
6,149,562 A * 11/2000 Patel et al. .................... 483/13

FOREIGN PATENT DOCUMENTS

| JP | 61-136750 | * 6/1986 | ................. 483/68 |
| JP | 63-48364 | 12/1988 | |

* cited by examiner

Primary Examiner—William Briggs
(74) Attorney, Agent, or Firm—Howson & Howson

(57) ABSTRACT

A rotating tool pot chain is capable of bending in both directions, the tool pot sweeps a relatively small area as it rotates, and the chain is capable of holding the tool pot stably. A pair of inner link plates (23) and a pair of outer link plates (24), are formed with openings to provide tool pot storage areas (23a, 24a) so that the tool pot, when stored, is parallel direction with the adjacent link connection pins 26. The center of each tool pot storage area (23a, 24a) is located on a chain pitch line passing through the centers of the adjacent connection pins 26. Further, the fulcrum (support pin 50) on which the tool pot 42 rotates is below the level of the adjacent connection pins 26 but above the bottoms of the tool pot storage areas (23a, 24a).

3 Claims, 4 Drawing Sheets

ROTATING TOOL POT CHAIN

FIELD OF THE INVENTION

This invention relates to a chain incorporating rotating tool pots, for use in the tool magazine of an automatic tool exchange apparatus.

BACKGROUND OF THE INVENTION

A rotating tool pot chain has a large number of tool pots equipped with tools, and travels in a circulating path in a tool magazine. In operation, the chain stops to position a particular tool pot at a tool exchange position along the circulating path in the tool magazine. At the tool exchange position, the tool pot rotates on the chain, and a tool is attached to, or detached from, the tool pot in a tool exchange operation.

A conventional rotating tool pot chain is disclosed in Japanese Utility Model Publication No. 63-48364, and is depicted in FIGS. 4 and 5 of this application, which are, respectively, a front elevational view, partly in cross-section, of the rotating tool pot chain, and a right side elevational view thereof.

The rotating tool pot chain 1 shown in FIGS. 4 and 5 consists of a chain 2 and a tool pot 12. In the chain 2, a connection pin 6 connects inner link plates 3, which interpolate rollers 5, and a pair of outer link plates 4 and 4'. One outer link plate 4 is laterally bent approximately perpendicularly to form a horizontal portion 7, and upwardly bent shaft supports 8 are formed on horizontal portion 7. The upwardly bent shaft supports 8 are hinged to brackets 13 provided on the back portion of the main body 15 of the tool pot 12 by a pin 14, so that the tool pot 12 is freely rotatable about the pin 14. A support 9, that holds the main body 15 of the tool pot 12, is formed on the other outer link plate 4'. A positioning roller 1 is freely rotatable about a pin 17 at the upper ends of the brackets 13.

When the chain 1 stops, positioning a tool pot at a tool exchange position along the circulating path in the tool magazine, a member (not shown) presses the roller 16, causing the tool pot 12 to rotate through an angle of approximately 90 degrees about pin 14. Then, in a tool exchange operation, a tool (not shown) is attached to, or detached from, the tool pot 12.

Several problems have been encountered in the operation of the rotating tool pot chain shown in FIGS. 4 and 5.

The center of the tool pot 12 is remote from the connection pins 6 of the chain 2 and therefore not on the pitch line of the chain. Consequently, the chain 1 can only be bent in one direction, i.e., the direction in which the tool pots separate from one another. It cannot be bent in the reverse direction because the tool pots would collide with one another. The inability of the chain to be bent in both directions limits the ways in which the tool magazine can be laid out.

The pin 14, which is the fulcrum about which the tool pot 12 rotates, and the positioning roller 16, are both located above the connection pins 6. The pin 14 should be close to the connection pins, but this means that the fulcrum is below the center of the tool pot, and results in a large distance from the fulcrum to the tip portion of the main body 15 of the tool pot. The area swept by the tool pot 12 when the tool pot 12 rotates is accordingly large.

Since pin 14, the fulcrum about which the tool pot 12 rotates, is located at the upper end of the outer link plate 4, and is remote from the pitch line of the chain 2, considerable vibration is transmitted from the chain to the tool pot 12. The vibration tends to cause the tool pot 12 to become unstable, and can cause a tool to drop from the tool pot.

The object of this invention is to solve the foregoing problems encountered with conventional rotating tool pot chains, and to provide a rotating tool pot chain that is capable of bending in both directions, that has tool pots arranged to sweep a small area as they rotate, and that is capable of holding the tool pots stably.

According to a first aspect of the invention, a rotating tool pot chain has tool pots attached to and carried by a chain comprising pairs of inner link plates and pairs of outer link plates arranged alternately along the length of the chain, and connection pins articulably connecting the pairs of inner link plates with the pairs of outer link plates. Each pair of inner link plates and each pair of outer link plates has an opening, the openings in the link plates of each pair of link plates forming tool pot receiving and storage areas. A fulcrum connects each said tool pot to a link plate of a pair of link plates for rotation of the tool pot about an axis parallel to the length of the chain. Each tool pot has a center, and the storage areas are positioned so that, when the tool pots are received in the storage areas, the centers of the tool pots are aligned with the connection pins along a chain pitch line passing through the centers of said connection pins.

According to a second aspect of the invention, at the tool exchange location along the chain path, each fulcrum is located at a level below the level of the chain pitch line, but preferably above the level of the bottoms of the tool pot storage areas.

By positioning the center of each tool pot storage area on the chain pitch line linking the centers of the adjacent connection pins, it is possible to bend the chain in both directions.

Furthermore, since the fulcrum about which the tool pot rotates is below the connection pins but above the bottoms of the tool pot storage areas, the area swept by the tool pot as it rotates is not large, and the tool pot is held stably on the chain.

DETAILED DESCRIPTION OF THE INVENTION

Figure 1:
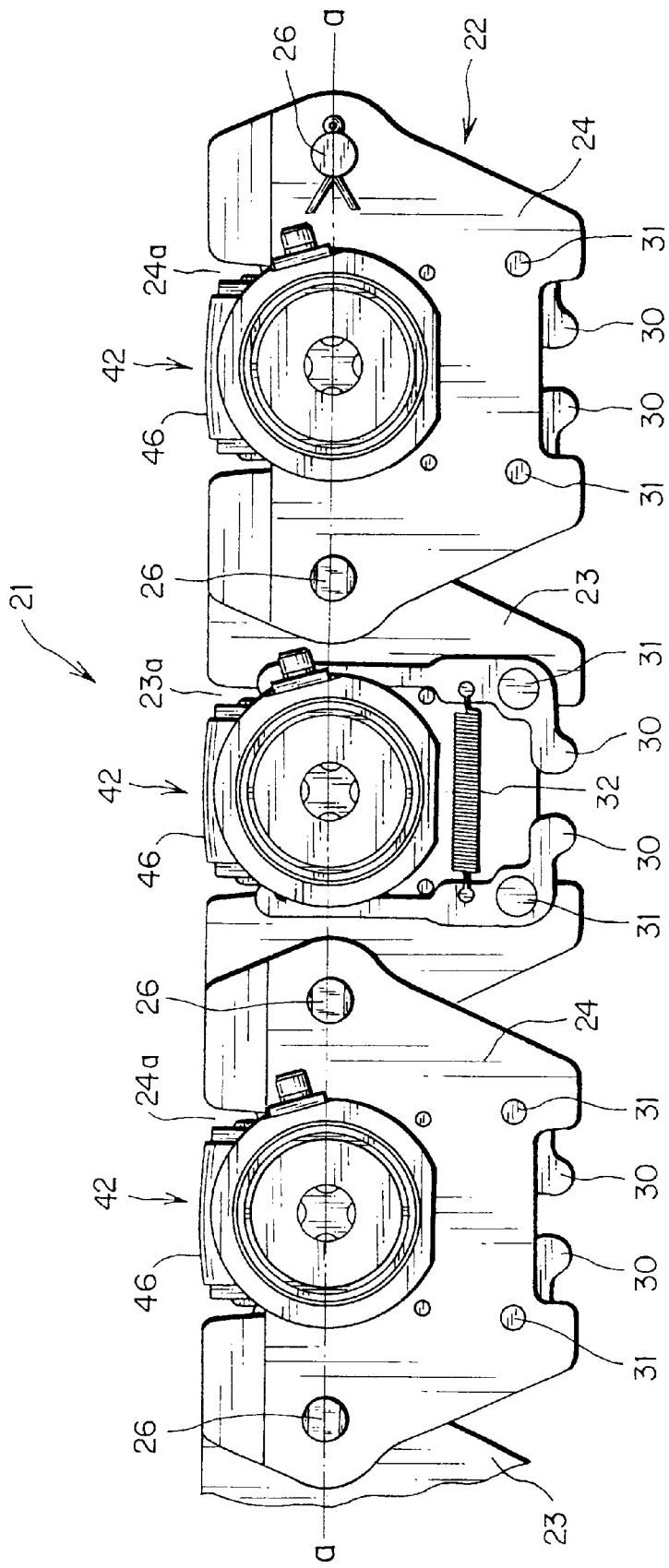
FIG. 1 is a side view of a part of a rotating tool pot chain according to an embodiment of this invention.
Figure 2:
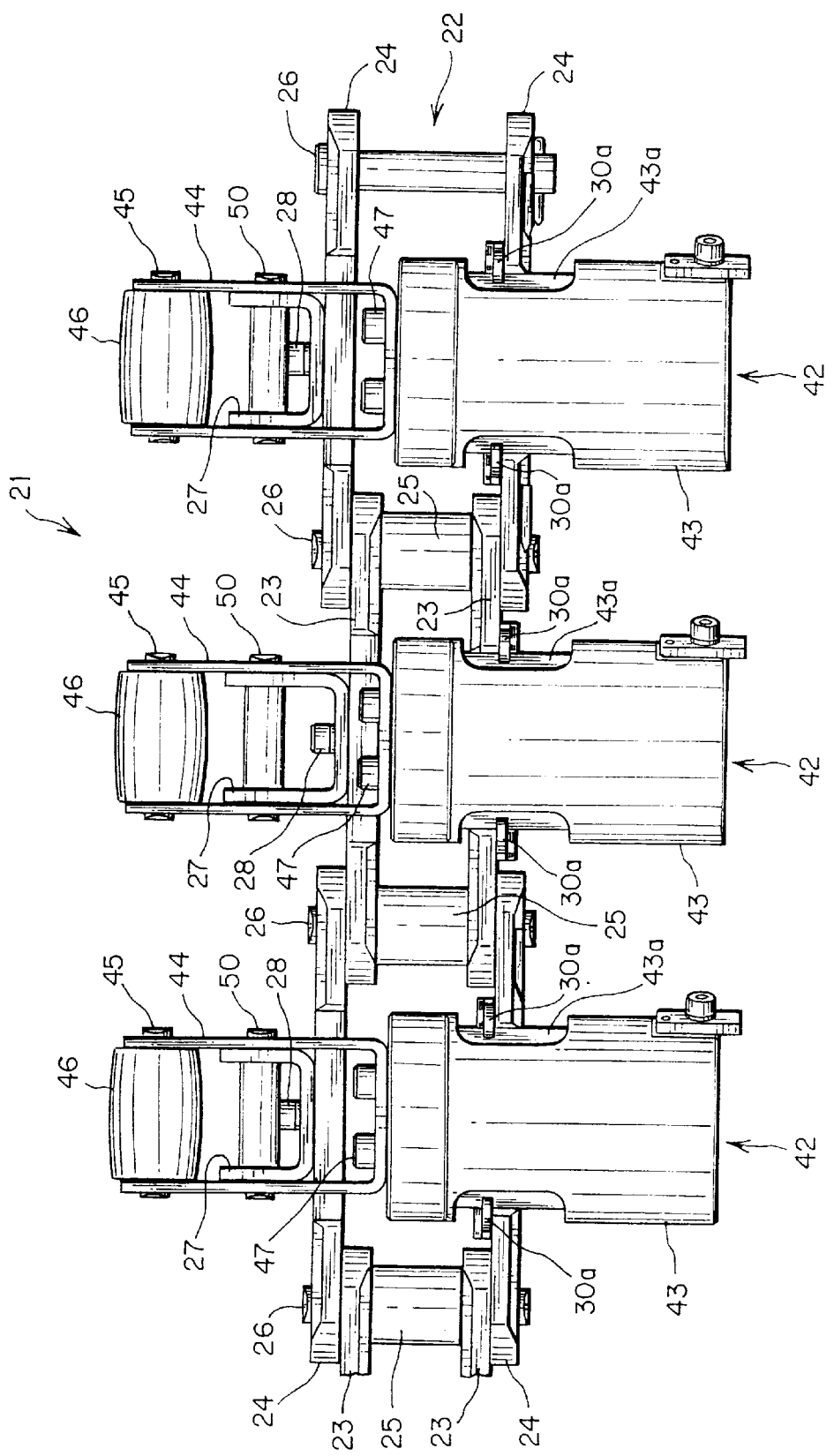
FIG. 2 is a top plan view of the rotating tool pot chain.
Figure 3:
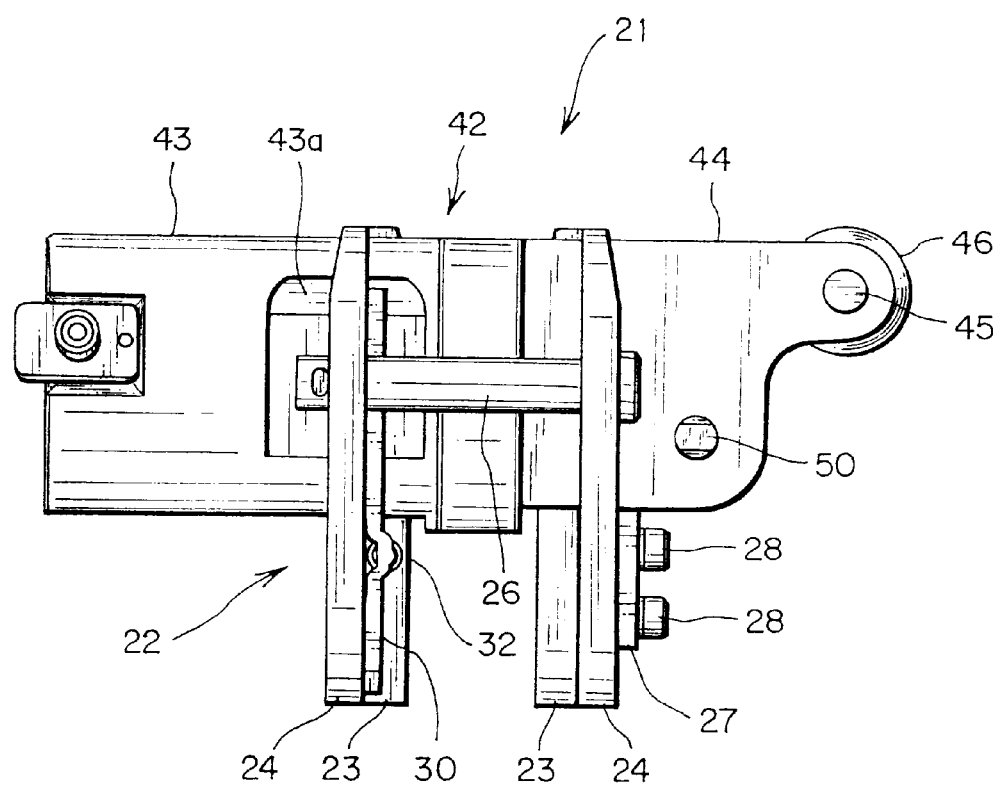
FIG. 3 is a right side elevational view of the rotating tool pot chain.
Figure 4:
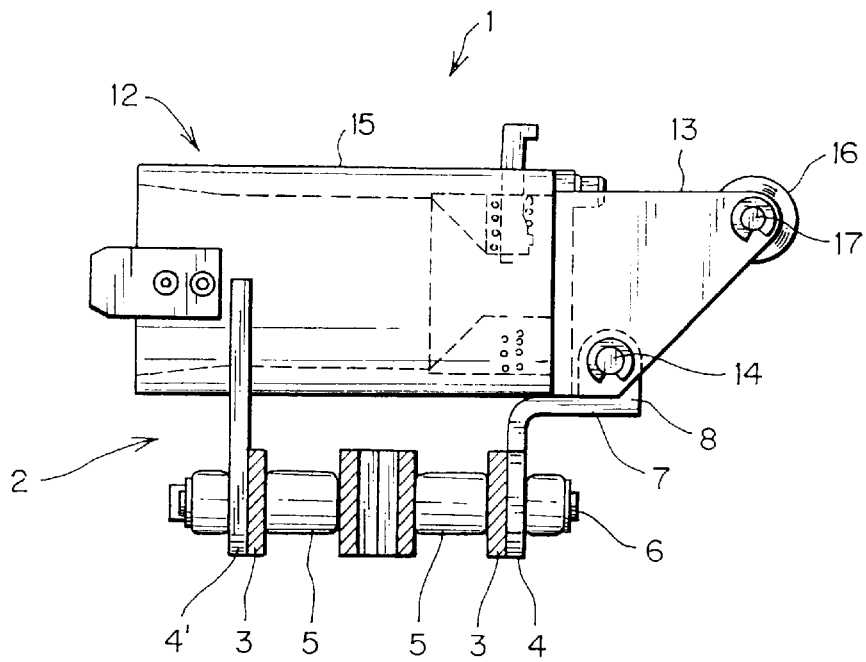
FIG. 4 is a cross-sectional end view of a conventional rotating tool pot chain.
Figure 5:
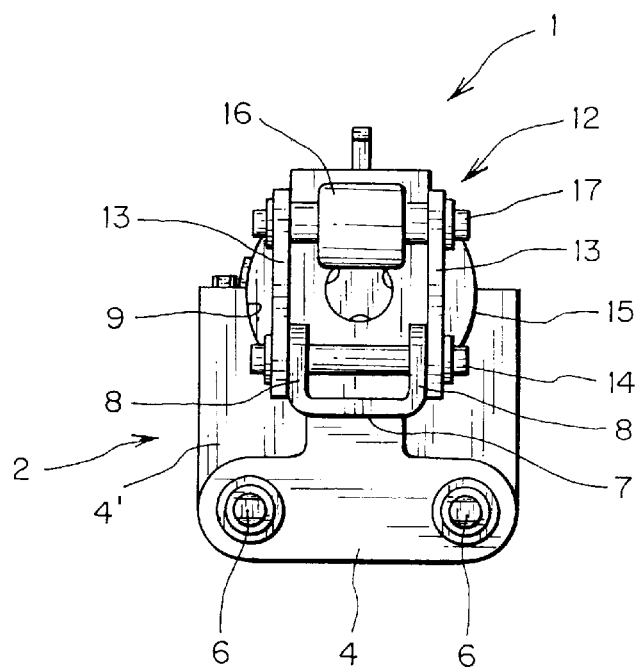
FIG. 5 is a right side elevational view of a link of the conventional rotating tool pot chain.

As shown in FIGS. 1 to 3, a rotating tool pot chain 21 according to the invention consists of a chain 22 and tool pots 42. In the chain 22, inner link plates 23, on both sides of a roller 25, and a pair of outer link plates 24 outside the inner link plate 23, are articulably connected by a connection pin 26. A tool pot storage area 23a, having an upper opening, is formed in the approximate center of each inner link plate 23. Similarly, a tool pot storage area 24a, having an upper opening, is formed in the approximately center of each outer link plate 24. The center of each tool pot storage area 23a and 24a, formed on the inner and outer link plates 23 and 24 respectively, is positioned on the chain pitch line a—a passing through the centers of adjacent connection pins 26.

As shown in FIGS. 2 and 3, a U-shaped tool pot attachment bracket 27 is attached by a bolt 28 to the outside of one inner plate 23 or each pair of inner link plates, and to the outside of one outer link plate 24 of each pair of outer link plates.

As shown in FIGS. 1 to 3, a pair of fingers 30, each of which including a hook 30a at a tip portion, is supported rotatably by support pins 31, and the fingers 30 are connected to each other by a coil spring 32 near the support pins 31.

A tool pot 42 consists of a main body 43 of approximately cylindrical shape, a U-shaped hinge 44, and a positioning roller 46. A pair of concave areas 43a for hook engagement is formed on an outer circumferential surface in the approximate center of each tool pot. The hinge 44 is attached on the back portion of the main body 43 of the tool pot by bolts 47. The positioning roller 46 is freely rotatable on a support pin 45 at the tip of the hinge 44.

As shown in FIGS. 2 and 3, the hinge 44 is attached to the tool pot attachment bracket 27 by a support pin 50, which allows free rotation of the hinge about the support pin axis. Tool pot attachment brackets 27 are attached outside one inner plates 23 of each pair, and outside one outer link plate 24 of each pair by bolts 28, as described above. The support pins 50 serve as fulcrums, and therefore, the tool pots 42 can rotate on the support pins 50 about axes parallel to the direction of the length of the chain.

In addition, as shown in FIG. 3, the support pin 50 is located below the level of connection pin 26 but above the bottoms of the tool pot storage areas 23a and 24a formed on the inner and outer link plates 23 and 24, respectively.

The tool pot 42 is shaped so that it is stored in the tool pot storage areas 23a and 24a. When the tool pot 42 is stored in the tool pot storage area 23a and 24a, the hooks 30a of a pair of fingers 30 engage the concave areas 43a under the tension applied by the coil spring 32, and the tool pot 42 is held in the storage areas provided by its associated link plates 23 or 24. Normally, a tool (not shown) is housed and held inside the main body 43 of the tool pot, which is of an approximately cylindrical shape. In the operation of the rotating tool pot chain 21 according to the invention, an instruction in an NC apparatus causes a drive mechanism (not shown) to move the rotating tool pot chain 21 along a circulating path in a tool magazine. The rotating tool pot chain 21 stops when a designated tool pot 42 reaches a tool exchange position. At the tool exchange position, a drive member (not shown) presses the rotation positioning roller 46, and the tool pot 42 rotates through an angle of approximately 90 degrees about the support pin 50 from a storage position in which it is approximately parallel to the adjacent connection pins 26. Thereafter, a tool (not shown) is attached to, or detached from, the tool pot 42 at this position in a tool exchange operation.

The rotating tool pot chain 21 according to the above-described embodiment of the invention has the following effects.

Since the center of each tool pot storage area 23a or 24a is positioned on the chain pitch line a—a passing through the centers of adjacent connection pins 26, the chain 22 is capable of bending in both directions. Further, since adjacent tool pots 42 do not interfere with each other when the chain 22 is bent, the chain can be bent freely in either direction in a path having a small radius of curvature. As a result, a great deal of freedom is available in designing the chain layout in a tool magazine, and a compact layout can be achieved more easily.

Furthermore, since the fulcrum about which the tool pot 42 rotates is below the connection pin 26, but above the bottoms of the tool pot storage areas 23a or 24a, the area swept by the tool pot 42 as it rotates is relatively small, and the tool pot 42 can be held stably. As a result, the layout of the tool exchange position can be made compact and the likelihood that a tool will be dropped from the tool pot is reduced.

What is claimed is:

1. A rotating tool pot chain having tool pots attached to and carried by a chain, wherein the chain comprises pairs of inner link plates and pairs of outer link plates arranged alternately along the length of the chain, and connection pins articulably connecting the pairs of inner link plates with the pairs of outer link plates, each said pair of inner link plates and each said pair of outer link plates having an opening, the openings in the link plates of each said pair of link plates forming tool pot receiving and storage areas, and a fulcrum connecting each said tool pot to a link plate of a pair of said link plates for rotation of the tool pot about an axis parallel to the length of the chain, wherein each said tool pot has a center, and the storage areas are positioned so that, when the tool pots are received in the storage areas, the centers of the tool pots are aligned with the connection pins along a chain pitch line at a level passing through the centers of said connection pins.

2. The rotating tool pot chain according to claim 1, wherein the rotating tool pot chain is arranged to pass through a tool exchange location, and, at said tool exchange location, each said fulcrum is located at a level below the level of said chain pitch line.

3. The rotating tool pot chain according to claim 1, wherein the rotating tool pot receiving and storage areas have bottoms, and the rotating tool pot chain is arranged to pass through a tool exchange location, and, at said tool exchange location, each said fulcrum is located at a level below the level of said chain pitch line, but above the level of the bottoms of the tool pot storage areas receiving the tool pot connected to the last-mentioned fulcrum.

* * * * *